United States Patent [19]
Ingham et al.

[11] 3,778,008
[45] Dec. 11, 1973

[54] SYSTEM FOR INITIATING ORDNANCE DEVICES MOUNTED UPON A ROTATING PLATE

[75] Inventors: Robert W. Ingham; Milton W. Chambers, both of Hollister, Calif.

[73] Assignee: Teledyne McCormick Selph, Hollister, Calif.

[22] Filed: Feb. 16, 1972

[21] Appl. No.: 226,878

[52] U.S. Cl. ............................ 244/17.11, 89/1 B
[51] Int. Cl. .................................... B64c 27/00
[58] Field of Search .............. 102/24 HC; 89/1 B, 89/9, 12, 13; 244/17.11

[56] References Cited
UNITED STATES PATENTS
3,229,931  1/1966  Larsen ........................... 244/17.11
3,352,236  11/1967  Baker et al. ..................... 102/24 HC
476,590  6/1892  Archbold .............................. 89/12

*Primary Examiner*—Trygve M. Blix
*Assistant Examiner*—Paul E. Sauberer
*Attorney*—David H. Semmes

[57] ABSTRACT

A system for the sequential transfer of lineal mechanical force to initiate ordnace detonators mounted upon a rotating plate, for example a system to sequentially detonate for the purpose of severing helicopter blades, so as to enable helicopter pilot ejection under emergency conditions.

15 Claims, 6 Drawing Figures

SYSTEM FOR INITIATING ORDNANCE DEVICES MOUNTED UPON A ROTATING PLATE

BACKGROUND OF THE INVENTION

1. Field of the Invention

Previously, there has not been provided an emergency procedure for ejection of helicopter pilots in the event of an in-flight emergency. The rotating helicopter blades precluded pilot ejection. If randomly severed they pose a danger to nearby formation helicopters. Therefore, little, if any, attention has been given to sequentially severing the helicopter blades, so as to enable precise directional trajectories of the removed blades to avoid striking other helicopters in the same formation.

SUMMARY OF THE INVENTION

The present application relates to a method for sequential initiation of ordnance devices on a rotating plate or mechanism. A contemporary problem in the aerospace industry is the means by which rotating ordnance initiated systems can be sequentially fired from a stationary point. Such a requirement exists on helicopter or other systems (employing a combination of fixed and rotational mechanisms) for transmitting detonation output to the rotor head for severance action of the blades in a precise and predicted ejection trajectory away from helicopters flying the same formation.

The invention consists of ordnance devices attached to a rotating mechanism and fired by a system of linear actuators and cams. The system is initiated by propagating a detonating shock through a confined detonating fuse or shielded mild detonating cord and displacing the linear actuator with firing pin assembly 1 into the path of the fixed cam 4 located on the rotating plate 5. See FIGS. 1 and 2.

The fixed cam 4 mounted on the rotating plate is located directly over the intended firing point to start the ignition sequence. As the fixed cam 4 on the rim of the rotor plate 5 strikes the cam follower 26 on the firing pin assembly 1 the sequence of events results in shearing of the safety pin 12 and instant compression of the spring 14 against the firing pin shaft assembly as shown in FIG. 3. At a pre-determined point the ball detent 16 in FIG. 3, is disengaged and the firing pin 20 is released with a constant spring force that initiates the primer 17 in FIG. 3, thus igniting the explosive train in the output end of the unit. A detonation shock wave is then transferred into and detonation continued by the engaged SMDC (shielded mild detonating cord) or CDF (confined detonating fuse) to the second linear actuator and sliding cam 9 in FIG. 1 located $\alpha$ degrees ahead of the first linear actuator 1. The sequentially fired sliding cam 9 is located in the stationary outer ring 27 and is moved into functioning position by an impulse or gas-operated piston 8 actuated by the interconnection CDF or SMDC assembly 7. One or more multispaced actuator stations 6 are provided on the rotating inner ring. Each station contains a firing pin initiated detonator assembly that is positively initiated by the repositioned cam 9 on the fixed plate.

The same firing sequence is repeated when the cam follower (roller) 10 on the end of the rotating plate mounted firing pin assembly 6 is driven inward by the linear actuated cam 9 the sequence of events results in: (1) shearing of the safety pin 12, and (2) instant compression of spring 14 against the firing pin shaft assembly. At a pre-determined point, the ball detents 16 are again disengaged and the firing pin 20 is released with a constant spring that initiates primer 17, thus initiating the explosive train in the output end of the firing pin assembly. The same firing sequence repeats for each succeeding station 6 as it passes across the face of the cam 9.

Ignition of all firing pin assemblies would be complete in one revolution of the rotating base 5. By this means a series of detonation output assemblies 6 mounted on rotating plates can be accurately fired from a gas or impulse operated cam on a fixed plate 27. Once initiated, these assemblies provide a means of propagating detonation shock stimulus to their respective end termination.

In the ensuing description, the term "detonation" is used generically to comprehend also a deflagration reaction.

Accordingly, it is an object of this invention to provide a method for ignition of sequential detonation on a rotating plate from a fixed gas or impulse operated cam on a stationary plate.

Another object of the invention is to provide the necessary mechanism by which location of "first ignition" on the rotating plate may be pre-determined.

Yet, additional objects of the invention will become apparent from the specifications and attached drawings wherein:

DESCRIPTION OF THE PREFERRED EMBODIMENTS

Figure 1:
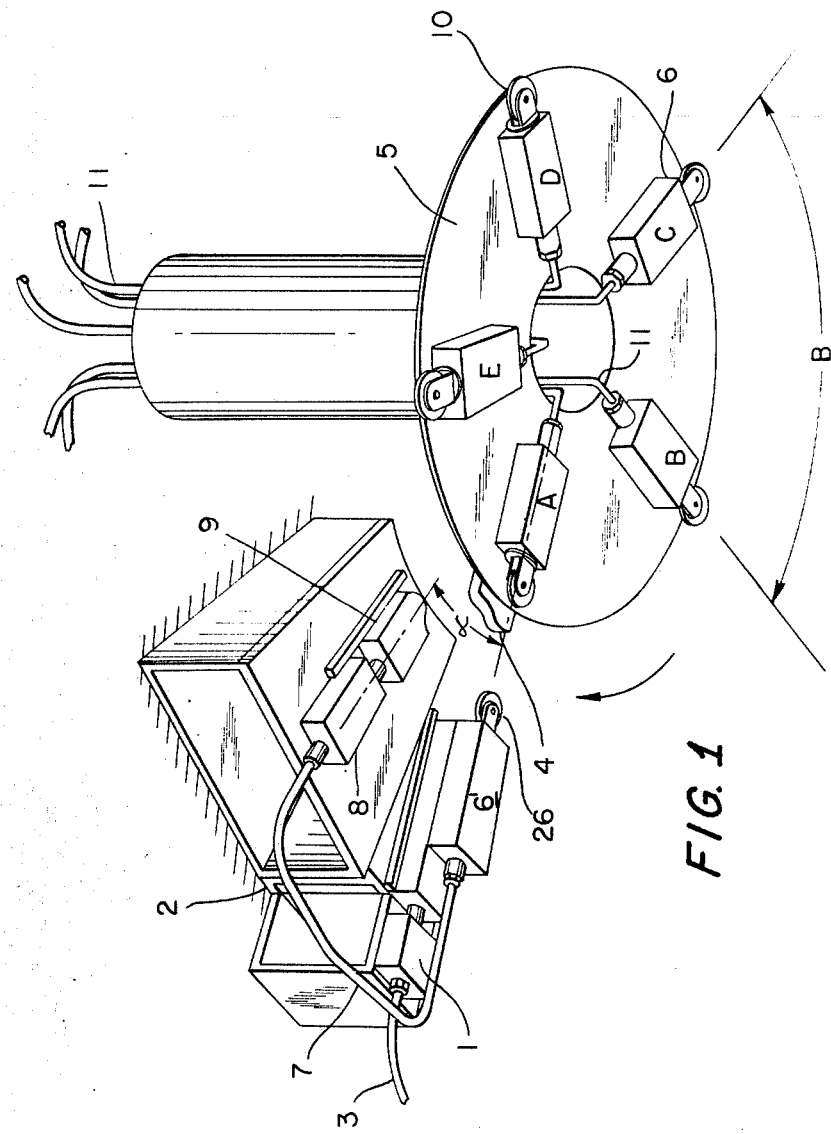
FIG. 1 is a fragmentary perspective, showing positioning of the helicopter rotating plate supporting a series of radially mounted ordnance devices and an adjacent stationary plate mounting first and second linear actuators.

In FIG. 1 there is illustrated a suggested sequential firing assembly comprising a linear actuator and firing pin assembly 1 mounted in a track to a fixed plate 2. Initiation by detonation input energy from CDF or SMDC 3 causes the first linear actuator assembly 1 to move into the path of the rotating cam 4 mounted upon the periphery of the rotating plate 5. The location of cam 4 pre-determines the first firing pin assembly 6 to be fired in the sequence system, in this case "A." When cam 4 strikes firing pin assembly 1 and related firing pin assembly 6' a detonation output fires into the CDF or SMDC 7 and propagates into the second linear actuator 8 which drives cam 9 into the arc of the cam follower 10 attached to each firing pin assembly 6 which is mounted upon rotating plate 5. Angle α between first linear actuator assembly 1 and second linear actuator assembly 8 represents the arc subtended by the firing pin assembly 6 when the rotating cam 4 first repositions to fire each firing pin assembly 6.

Figure 3:
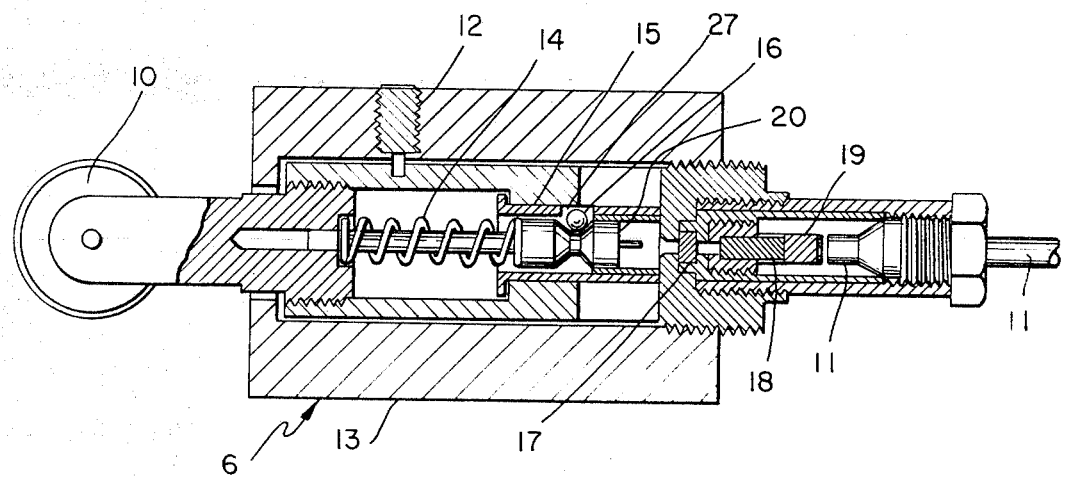
FIG. 3 is a vertical section of a single radially positioned ordnance device, showing the cam responsive means, compression means, firing pin and explosive train.

As illustrated in FIGS. 1 and 3 angle B is the angle between each firing pin assembly 6 mounted upon rotating plate 5 that can be pre-determined to initiate a detonation output through connecting CDF or SMDC 11 to a receptor such as cartridge actuated devices or flexible linear shaped charges. In FIG. 1, firing pin assembly 6 designated "A" and mounted upon rotating plate 5 will always be the first sequentially fired ordnance device by the second linear actuator 8 and cam 9.

Figure 2:
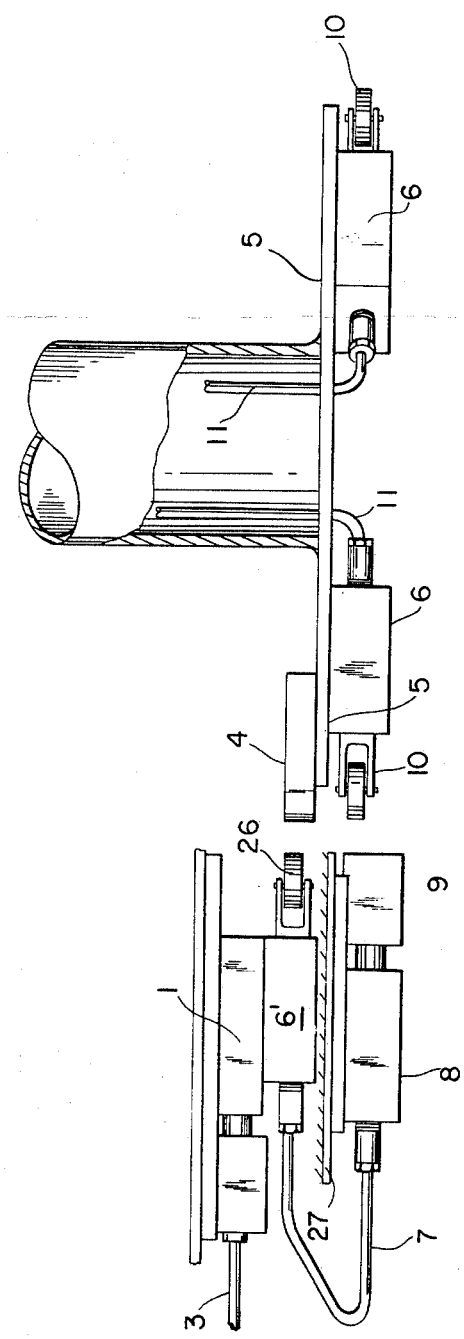
FIG. 2 is a fragmentary elevation, partially in section, through the stationary plate showing superposition of the first and second linear actuator elements and adjacent the helicopter rotating plate, supporting the stationary cam and radially positioned ordnance devices.

In FIG. 2 there is illustrated the relative position of the rotating cam 4 in line with the first linear actuator assembly 1 and its related firing pin assembly 6. SMDC or CDF 3 is shown attached to the first linear actuator assembly 1 and drives cam 9 into position to depress roller cam followers 10 into each of the firing pin assemblies 6, ("A", "B", "C", and "D"). As plate 5 rotates each firing pin assembly 6 is sequentially fired by cam 9.

In FIG. 3 there is illustrated the longitudinal cross section of each firing pin assembly 6 which is mounted upon rotating plate 5. The safety pin 12 is sheared when the cam roller follower 10 is driven into body 13 compressing the spring 14 and uncovering the port 27 in the firing pin sleeve 15 to release and strike the primer 17. A suggested explosive train, consisting of lead azide 18 and RDX 19, produces a detonation output capable of intiating SMDC or CDF 11.

Figure 4:
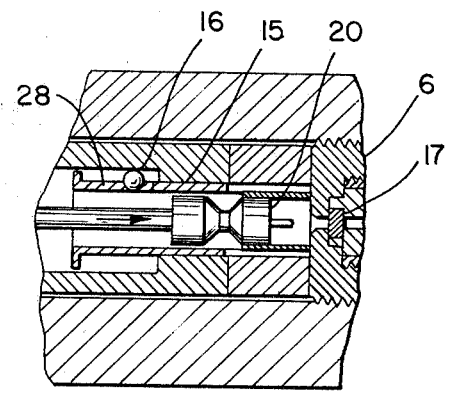
FIG. 4 is a fragmentary section of the linear assembly, illustrated in FIG. 3, showing the firing pin released from the ball detent for actuation of the explosive train which, in turn, detonates the explosive cutting device located around the individual helicopter blades.

In FIG. 4 there is shown a similar longitudinal section of the firing pin assembly 6 when the ball detent 16 has been displaced through the uncovered port 27 in the firing pin sleeve 15 and the firing pin 20 released to strike the primer 17.

Figure 5:
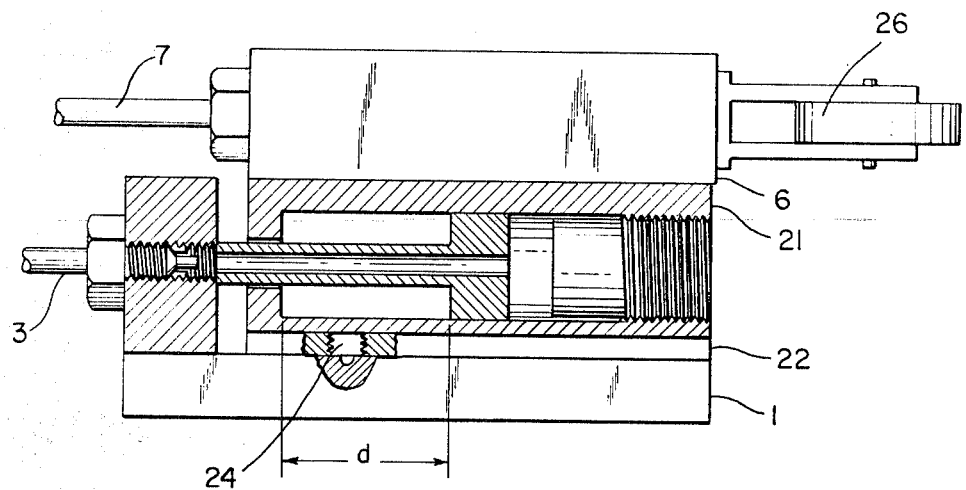
FIG. 5 is a fragmentary, enlarged elevation, partially in section, showing the stationary plate first linear actuator and its related firing pin assembly extensible into the path of the rotating plate stationary cam.

In FIG. 5 there is illustrated the linear actuated assembly 1 with a similar firing pin assembly 6' mounted on top of a sliding base 21. When SMDC or CDF 3 detonates, the output energy actuates sliding base 21 in track 22 a distance equivalent to "D." The linear displacement of the sliding base 21 positions firing pin assembly 6' and its follower 26 to be impacted by the rotating cam 4. A simple ball detent 24 keeps the housing locked in the fully extended position, as well as in the unfired position.

Figure 6:
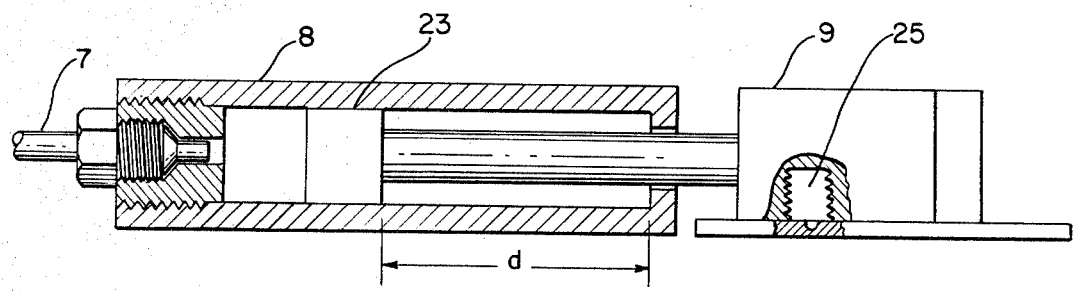
FIG. 6 is an enlarged, fragmentary elevation, partially in section, showing the second linear actuator, including the chamber, and linearly aligned piston and sliding cam element extensible into the path of the ordnance devices mounted upon the rotating plate.

In FIG. 6 there is illustrated second linear reactor 8 fired by CDF 7, so as to drive aligned piston 23 and related sliding cam element 9 into the path of the cam followers 10. Cam followers 10 are thus depressed into each of the firing pin assemblies 6. A ball detent 25 may be used to lock together the cam components.

We claim:

1. System for initiating ordnance devices mounted upon a rotating plate comprising:
    A. a series of radially positioned ordnance devices mounted upon said rotating plate including:
        i. a shock responsive element which protrudes beyond the periphery of the plate, and
        ii. a detonation element extending inwardly of said plate;
    B. a stationary cam mounted upon said plate, so as to extend beyond the periphery;
    C. a first linear actuator mounted upon a stationary base adjacent said rotating plate and including
        i. a firing pin assembly,
        ii. a first shock responsive element connected to and actuated by said firing pin assembly so as to protrude into the path of said stationary cam, as said plate rotates;
    D. a second linear actuator mounted upon said stationary base adjacent said rotating plate and including:
        i. a second shock responsive element connected to said first shock responsive element in said first linear reactor actuator and
        ii. a sliding cam extensible upon detonation action into the rotating arc of said radially positioned ordnance devices mounted upon said rotating plate.

2. A system for initiating ordnance devices mounted upon a rotating plate as in claim 1, said rotating plate being mounted upon a main helicopter rotor shaft and extending below rotor head and blade articulation mechanisms.

3. A system for initiating ordnance devices mounted upon a rotating plate as in claim 2, each of said ordnance devices mounted upon said plate being attached to a helicopter rotor shaft, such that a detonating shock may be propagated, so as to sequentially sever the helicopter blades.

4. A system for initiating ordnance devices mounted upon a rotating plate as in claim 3, whrein confined detonating fuse is used within said first linear reactor to advance said first shock responsive element into the path of said cam.

5. A system for initiating ordnance devices mounted upon a rotating plate as in claim 4, wherein confined detonating fuse is used to transmit shock from said first shock responsive element to said second shock responsive element in said second linear actuator, so as to extend said sliding cam into the rotating of arc of said radially positioned ordnance devices.

6. A system for initiating ordnance devices mounted upon a rotating plate as in claim 5, wherein said radially positioned ordnance device mounted upon said rotating plate includes:
    i. a rotatable cam follower, extending beyond the periphery of said plate;
    ii. a firing pin;
    iii. a lineal compressive member interconnecting said rotatable cam and said firing pin, and
    iv. an explosive train actuable by means of lineal movement of said firing pin and said compressive member, including a confined detonating fuse leading from said explosive train inwardly of said rotating plate.

7. A system for initiating ordnance devices mounted upon a rotating plate as in claim 6, wherein said confined detonating fuse leads from said explosive train to each of said helicopter blades.

8. A system for initiating ordnance devices mounted upon a rotating plate as in claim 7, wherein said first lineal actuator firing pin assembly further includes: a firing pin, a sliding base and cam follower and linearly aligned, such that linear actuation of said firing pin linearly advances said cam follower into the path of said stationary cam member mounted upon said rotating plate.

9. A system for initiating ordnance devices mounted upon a rotating plate as in claim 8, wherein said second linear actuator sliding cam further includes:
   i. a cylinder,
   ii. a gas discharge mechanism,
   iii. a confined detonating fuse leading from said first shock responsive element in said first linear actuator into said gas discharge mechanism,
   iv. a sliding piston actuable within said cylinder by gas discharge and
   v. a sliding cam mounted abutting said piston and extensible into the rotating arc of said rotatable cam follower mounted upon said rotating plate.

10. A system for initiating ordnance devices mounted upon a rotating plate as in claim 9, wherein said rotatable cam followers and said sliding cam mounted upon said stationary base are coextensive.

11. A system for initiating ordnance devices mounted upon a rotating plate as in claim 10, wherein said stationary cam and said rotatable cam followers mounted upon said rotating plate are coextensive peripherally outwardly of said rotating plate.

12. A system for initiating ordnance devices mounted upon a rotating plate as in claim 11, wherein each of said radially positioed ordnance devices includes a ball detent member locking said lineal compressive member in extended position radially outwardly of said plate, as said explosive train is actuated.

13. A system for initiating ordnance devices mounted upon a rotating plate as in claim 12, wherein the first linear actuator and said second linear actuator are disposed at an angle $\alpha$ therebetween which represents the arc subtended by the rotatable cam follower as it repositions to fire each firing pin assembly.

14. A system for initiating ordnance devices mounted upon a rotating plate as in claim 12, wherein the rotating plate mounted firing pin assemblies are spaced by an angle B which represents the distance therebetween and can be predetermined.

15. In a helicopter of the type having a hollow rotor shaft and a plurality of helicopter blades attached to the shaft, a blade destruction system comprising:
   A. a rotating plate rotatable with said rotor shaft and mounting a plurality of radially positioned shock responsive elements protruding beyond the periphery thereof;
   B. an individual detonation train leading from each shock responsive element to each said helicopter blade, and
   C. cam means independently positioned apart from said rotating plate and linearly extensible into the rotating plane of said shock responsive elements mounted on said rotating plate to actuate said shock responsive elements and thereby said detonation trains to detonate and sever said helicopter blades.

* * * * *